(12) United States Patent
Schaefer et al.

(10) Patent No.: US 12,162,977 B2
(45) Date of Patent: Dec. 10, 2024

(54) BLOCKED POLYISOCYANATE CROSSLINKING AGENT, ITS PREPARATION METHOD AND A COATING COMPOSITION COMPRISING THE SAME

(71) Applicant: BASF COATINGS GMBH, Münster (DE)

(72) Inventors: Christian Gerhard Schaefer, Shanghai (CN); Shengzhong Zhou, Shanghai (CN); Stefan Hirsemann, Shanghai (CN); Wen Mei Liu, Shanghai (CN)

(73) Assignee: BASF COATINGS GMBH, Muenster (DE)

( * ) Notice: Subject to any disclaimer, the term of this patent is extended or adjusted under 35 U.S.C. 154(b) by 0 days.

(21) Appl. No.: 17/775,991

(22) PCT Filed: Nov. 9, 2020

(86) PCT No.: PCT/EP2020/081429
§ 371 (c)(1),
(2) Date: May 11, 2022

(87) PCT Pub. No.: WO2021/094237
PCT Pub. Date: May 20, 2021

(65) Prior Publication Data
US 2022/0389153 A1   Dec. 8, 2022

(30) Foreign Application Priority Data
Nov. 15, 2019 (WO) .............. PCT/CN2019/118963

(51) Int. Cl.
*C08G 18/80* (2006.01)
*C08G 18/16* (2006.01)
*C08G 18/67* (2006.01)
*C08G 18/73* (2006.01)
*C08G 18/79* (2006.01)
*C09D 175/06* (2006.01)

(52) U.S. Cl.
CPC ....... *C08G 18/8093* (2013.01); *C08G 18/168* (2013.01); *C08G 18/672* (2013.01); *C08G 18/73* (2013.01); *C08G 18/792* (2013.01); *C08G 18/807* (2013.01); *C09D 175/06* (2013.01); *C08G 2150/00* (2013.01)

(58) Field of Classification Search
CPC ................ C08G 18/8093; C08G 18/168; C08G 18/672; C08G 18/73; C08G 18/807; C08G 2150/00; C08G 18/792; C09D 175/06
See application file for complete search history.

(56) References Cited

U.S. PATENT DOCUMENTS

| | | |
|---|---|---|
| 5,945,499 A | 8/1999 | Ohrbom et al. |
| 6,559,264 B1 | 5/2003 | Koenig et al. |
| 2009/0298962 A1 | 12/2009 | Studer et al. |
| 2012/0031629 A1 | 2/2012 | Kochelek et al. |

FOREIGN PATENT DOCUMENTS

| | | | | |
|---|---|---|---|---|
| CN | 102585739 A | * | 7/2012 | |
| CN | 104273135 A | * | 1/2015 | |
| CN | 107700214 A | * | 2/2018 | .......... C08F 283/008 |
| JP | 2001-278945 A | * | 10/2001 | |
| JP | 2008-280418 A | * | 11/2008 | |
| JP | 2014-22191 A | * | 2/2014 | |

OTHER PUBLICATIONS

International Search Report and Written Opinion for corresponding PCT/EP2020/081429 mailed Feb. 19, 2021, 7 pages.

* cited by examiner

*Primary Examiner* — Rabon A Sergent
(74) *Attorney, Agent, or Firm* — Armstrong Teasdale LLP

(57) ABSTRACT

Described herein is a blocked polyisocyanate crosslinking agent obtained from reactions of components including a). at least one polyisocyanate selected from the group consisting of aliphatic polyisocyanate, cycloaliphatic polyisocyanate and polyisocyanate-functional polymer and b). at least one beta-diketone. Also described herein is a method of preparing a blocked polyisocyanate crosslinking agent as well as coating compositions including the blocked polyisocyanate crosslinking agent.

13 Claims, No Drawings

BLOCKED POLYISOCYANATE CROSSLINKING AGENT, ITS PREPARATION METHOD AND A COATING COMPOSITION COMPRISING THE SAME

CROSS-REFERENCE TO RELATED APPLICATIONS

This application is a U.S. National Phase Application of PCT/EP2020/081429, filed Nov. 9, 2020, which claims the benefit of priority to International Patent Application No. PCT/CN2019/118963, filed Nov. 15, 2019, the entire contents of which are hereby incorporated by reference herein.

TECHNICAL FIELD

This invention relates to a blocked polyisocyanate crosslinking agent, its preparation method and a coating composition comprising such blocked polyisocyanate crosslinking agent and more specifically an automotive coating composition comprising such blocked polyisocyanate crosslinking agent.

BACKGROUND

Blocked polyisocyanates as curing agent (crosslinking agent) are widely used in baking of automotive coating compositions. U.S. Pat. No. 6,559,264B1 disclosed aliphatic and/or cycloaliphatic polyisocyanates comprising A) 5-95, preferably 70 to 30, equivalent % of the isocyanate groups thereof are blocked (reacted) with an acidic CH ester, B) 5-95, preferably 70 to 30, equivalent % of the isocyanate groups thereof are blocked (reacted) with 1,2,4-triazole, and C) 0-10 equivalent % of the isocyanate groups thereof are blocked (reacted) with other blocking agents which are different from A) and B), and they contain 0.05-1.0 moles of formaldehyde in incorporated form with respect to 100 equivalent % of blocked NCO groups. However, the amount of solvent is not reduced and therefore VOC (volatile organic compound) problem exits. US2012/031629A1 disclosed that aliphatic polyisocyanates, alicyclic polyisocyanates and aromatic polyisocyanates are blocked by mixtures of C,H-acidic groups and N,H-active hydrogen-containing compound to provide a blocked polyisocyanate composition. The amount of solvent is reduced, however, the isocyanates and polyacrylate/polyols are not able to react with each other.

Therefore, it still requires a blocked polyisocyanate crosslinking agent for coating compositions that has an excellent flowability, high storage stability and is able to cure the coating compositions via radical polymerization and/or the reaction of isocyanates and polyacrylate/polyols.

SUMMARY OF THE INVENTION

In one aspect, this invention provides a blocked polyisocyanate crosslinking agent obtained from reactions of components comprising
 a). at least one polyisocyanate selected from aliphatic polyisocyanate, cycloaliphatic polyisocyanate and polyisocyanate-functional polymer; and
 b). at least one beta-diketone.

In another aspect, this invention provides a method of preparing a blocked polyisocyanate crosslinking agent comprising steps of:

i). reactions of polyisocyanate and beta-diketone; and
 ii) reactions of (meth)acrylate and the resultant product obtained from step i).

In another aspect, this invention provides a coating composition comprising
 A). at least one invented blocked polyisocyanate crosslinking agent; and B). at least one reactive diluent.

In another aspect, this invention provides a coating composition comprising
 A). at least one invented blocked polyisocyanate crosslinking agent; and C). at least one polyol.

In another aspect, this invention provides a coating composition comprising
 A). at least one invented blocked polyisocyanate crosslinking agent; B). at least one reactive diluent; and C). at least one polyol.

In a further aspect, this invention provides a coating composition comprising
 A). at least one invented blocked polyisocyanate crosslinking agent; B). at least one reactive diluent; and D). at least one unsaturated polyester.

DETAILED DESCRIPTION OF THIS INVENTION

Unless defined otherwise, all technical and scientific terms used herein have the meaning commonly understood by a person skilled in the art to which the invention belongs. As used herein, the following terms have the meanings ascribed to them below, unless specified otherwise.

As used herein, the articles "a" and "an" refer to one or to more than one (i.e., to at least one) of the grammatical object of the article. By way of example, "an element" means one element or more than one element.

As used herein, the article "1K" refers to a composition having all of its components in one package.

As used herein, the article "2K" refers to a composition comprising two components, each of which may also be a mixture of several compounds. The two components can be blended together if needed. And the two components may also be two independent packages that can be mixed on the spot for applications.

As used herein, the article "(poly)isocyanate" refers to (poly)isocyanates having at least two NCO groups for reacting with active hydrogen containing compounds.

As used herein, the article "blocked (poly)isocyanate" refers to (poly)isocyanates that are unable to react until they are exposed to a specific deblocking temperature or agent.

As used herein, the article "reactive diluent" refers to monomers playing a role of solvent for resins and later taking reactions with components of resins that have unsaturated groups.

As used herein, the article "solid content" refers to a proportion of non-volatile material contained in a coating, paint or other suspension that is the material left after the volatile solvent has vaporized.

The objective of this invention is to provide a blocked polyisocyanate crosslinking agent for 1K and 2K coating compositions that has an excellent flowability, good storage stability and enables dual curing (radical polymerization and the reaction of isocyanate and polyacrylate/polyol) of the coating compositions.

Blocked Polyisocyanate Crosslinking Agent

The blocked polyisocyanate crosslinking agent according to this invention is obtained from reactions of components comprising a). at least one polyisocyanate selected from aliphatic polyisocyanate, cycloaliphatic polyisocyanate and polyisocyanate-functional polymer; and b). at least one beta-diketone.

The polyisocyanates on which the blocked polyisocyanates are based are known polyisocyanates comprising aliphatically and/or cycloaliphatically bonded isocyanate groups and/or polyisocyanate-functional polymer and the content of isocyanate (NCO) groups is from 10% to 50% and preferably from 15% to 35% by weight. Preferably, the polyisocyanates at least one selected from hexamethylene diisocyanate, hexamethylene diisocyanate trimer, 4,4'-dicyclohexylmethane diisocyanate and polyisocyanate-functional aliphatic acrylic ester. Polyisocyanates based on other isocyanates could also be used, for example diisocyanatobutane-1,4,2,4-cyclohexane, 2,6-diisocyanato-1-methyl-cyclohexane, 2,5-bis-isocyanato-norbornane, 2,6-bis-isocyanato-norbornane, 3-isocyanatomethyl-1-methylcyclohexane, 4-isocyanatomethyl-1-methylcyclohexane, 1,4-bis-(2-isocyanato-prop-2-yl)-benzene, 1,3-diisocyanatomethylbenzene, 1,3-bis-isocyanatomethylcyclohexane and 1,4-bis-isocyanatomethylcyclohexane.

The beta-diketone is reacted with partial of NCO groups of polyisocyanates. Preferably the beta-diketone is at least one selected from 1,3-indandione, 1-(2-aminophenyl)decane-1,3-dione, 2'-O-methyllicodione, 2,4,4',6-tetrahydroxydibenzoylmethane, 2,4-dioxopentanedioic acid, Ethyl 2-oxocyclopentanecarboxylate, 2-[(2,6-dioxocyclohexyl)methyl]cyclohexane-1,3-dione, 2-[(4,4-dimethyl-2,6-dioxocyclohexyl)methyl]-5,5-dimethylcyclohexane-1,3-dione, 2-[1-(2,6-dioxocyclohexyl)-3-phenylprop-2-ynyl]cyclohexane-1,3-dione, 2-cyano-3-cyclopropyl-1-(2-mesyl-4-trifluoromethylphenyl)propan-1,3-dione, 3,5-dioxooctanedioic acid, 3,6-dihydroxycyclohexane-1,2,4,5-tetrone, 3-dehydro-scyllo-inosose, 3-fumarylpyruvic acid, 3-hydroxy-2,4-dioxopentyl phosphate, 3-maleylpyruvic acid, 3-undecylcyclohexane-1,2,4,5-tetrone, 4,6-dioxohept-2-enedioic acid, 4,6-dioxoheptanoic acid, 4-(2-aminophenyl)-2,4-dioxobutanoic acid, 4-(3-methyl-5-isoxazolyl)-5-phenyl-cyclohexane-1,3-dione, 4-[4-(3,5-dioxohexyl)phenylcarbamoyl]butyric acid, 4-fumarylacetoacetic acid, 4-maleylacetoacetic acid, 5,7-icosanedione, 5-(2,2-diferuloylethen-1-yl)thalidomide, 5-(2-furanyl)cyclohexane-1,3-dione, 5-(hydroxymethyl)-3-(1-oxohexadecyl)oxolane-2,4-dione, 5-ethylundecane-2,4-dione, 5-hydroxy-2,4-dioxopentanoic acid, 6,8-icosanedione, 6-Gingerdione, acetylacetone, acetylpyruvic acid, alpha-acetylbutyrolactone, anisindione, berkeleydione, berkeleytrione, bicyclo[2.2.2]octane-2,6-dione, bicyclopyrone, bisdemethoxycurcumin, clethodim, curcumin, cyclohexane-1,3-dione, cyclopentane-1,3-dione, cycloxydim, demethoxycurcumin, dibenzoylmethane, dihydrocurcumin, hentriacontane-14,16-dione, licodione, ninhydrin, nonane-4,6-dione, phenindione, tenuazonic acid, tetrahydrocurcumin and tritriacontane-16,18-dione. More preferably, the beta-diketone is at least one selected from ethyl 2-oxocyclopentanecarboxylate and/or alpha-acetylbutyrolactone.

Preferably, at least one (meth)acrylate having sulfhydryl group and/or amino group and/or hydroxyl group could be added to react with NCO groups of polyisocyanate as well. Beta-diketones together with (meth)acrylate consume all NCO groups of polyisocyanate. Preferably, said (meth)acrylate is at least one selected from 2-hydroxyethyl acrylate, 2-hydroxypropyl acrylate, 2-hydroxyethyl methacrylate, 3- and 4-hydroxybutyl acrylate, 3- and 4-hydroxybutyl methacrylate, 6-hydroxyethyl acrylate, 6-hydroxyethyl methacrylate, 3-hydroxy-2-ethylhexyl acrylate, 3-hydroxy-2-ethylhexyl methacrylate, 2-hydroxypropyl methacrylate, 3-(acryloyl)-2-hydroxypropyl methacrylate, pentaerythritol triacrylate, pentaerythritol trimethacrylate, 2-aminoethyl acrylate, 2-aminoethyl methacrylate, 2-(tert-butylamino)ethyl acrylate, 2-(tert-butylamino)ethyl methacrylate, N,N-diethylaminoethyl acrylate, N,N-diethylaminoethyl methacrylate, N,N-dimethylaminoethyl acrylate N,N-dimethylaminoethyl methacrylate, 2,2,6,6-tetramethyl-4-piperidyl acrylate, and 2,2,6,6-tetramethyl-4-piperidyl methacrylate. Mixtures thereof can also be used. And more preferably, the (meth)acrylate is at least one selected from 2-(tert-butylamino)ethyl methacrylate, 2-hydroxyethyl methacrylate and 2-hydroxyethyl acrylate.

It is surprisingly found that the combination of beta-diketone and (meth)acrylate to block polyisocyanate enables the obtained blocked polyisocyanate crosslinking agent an excellent flowability, good storage stability and applicable for dual-curing (radical polymerization and the reaction of isocyanate and polyacrylate/polyol) of automotive coating compositions.

Preferably, the molar ratio of the beta-diketones and (meth)acrylate is from 1:10 to 10:1 and more preferably from 1:2 to 2:1. A lower ratio of beta-diketones or a higher ratio of (meth)acrylate tends to obtain a blocked polyisocyanate crosslinking agent that leads to a non-tack free coating layer.

When said (meth)acrylate is present, the blocked polyisocyanate crosslinking agent is prepared by steps of i). reactions of polyisocyanate and beta-diketone; and ii) reactions of (meth)acrylate and the resultant product obtained from step i).

Coating Compositions

The blocked polyisocyanate crosslinking agent could be used for 1K and 2K coating compositions. For example, a coating composition could be prepared that comprises at least one invented blocked polyisocyanate crosslinking agent and at least one reactive diluent. In another example, a coating composition could be prepared that comprises at least one invented blocked polyisocyanate crosslinking agent and at least one polyol. In another example, a coating composition could be prepared that comprises at least one invented blocked polyisocyanate crosslinking agent, at least one reactive diluent; and at least one polyol. And in a further example, a coating composition could be prepared that comprises at least one invented blocked polyisocyanate crosslinking agent, at least one reactive diluent and at least one unsaturated polyester.

Preferably, the reactive diluent is at least one selected from the (meth)acrylate is at least one selected from methyl acrylate, methyl methacrylate, ethyl acrylate, ethyl methacrylate, propyl acrylate, propyl methacrylate, isopropyl acrylate, isopropylmethacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, 2-ethylhexyl acrylate, 2-hydroxyethyl acrylate, 2-ethylhexyl methacrylate, 3,3,5-trimethylhexyl acrylate, 2-hydroxyethyl methacrylate, 3,3,5-trimethylhexyl methacrylate, cyclohexyl acrylate, cyclohexyl methacrylate, isobornyl acrylate, isobornyl methacrylate, norbonyl acrylate, norbonyl methacrylate, adamantyl acrylate, 1,4-butanediol diacrylate, 1,4-butanediol dimethacrylate, 2-(tert-butylamino)ethylmethacrylate, 1,6-hexanediol diacrylate, 1,6-hexanediol dimethacrylate, trimethylolpropane triacrylate, trimethylolpropane trimethacrylate, ethoxylated diacrylate, ethoxylated dimethacrylate, ethoxylated triacrylate, ethoxylated trimethacrylate, pentaerythritol tetraacrylate, pentaerythritol tetramethacrylate, di(trimethylolpropane) tetraacrylate, and di(trimethylolpropane) tetramethacrylate. More preferably, the (meth)acrylate is at least one selected from 2-(tert-butylamino)ethylmethacrylate, 2-hydroxyethyl methacrylate and 2-hydroxyethyl acrylate.

The polyol is any known polyether polyols and/or polyester polyols and/or polyacrylate-based polyol, for example, polyethylene oxide, polyethylene glycol and polypropylene glycol. Polyols are used, in combination with polyisocyanates to produce polyurethanes.

The unsaturated polyesters have double bonds in backbone and/or side chains and hydroxyl and/or carboxyl groups. Preferably the unsaturated polyesters are selected from maleic anhydride based unsaturated polyester, itaconic acid based unsaturated polyester, fumaric acid based unsaturated polyester, trans-aconitic acid based unsaturated polyester and hexahydrophthalic anhydride based unsaturated polyester.

Additives such as high solid content sagging control agent could be added into the coating composition to improve the thixotropic behavior. Sagging control agent used in this invention has a solid content of no less than 90% by weight based on the total weight of sagging control agent. Preferably, the sagging control agent is at least one selected from benzylamine and hexamethylene diisocyanate based sagging control agent, methoxypropylamine and hexamethylene diisocyanate trimer based sagging control agent.

The beta-diketones for example ethyl 2-oxocyclopentanecarboxylate is de-blocked at a temperature of 140° C. and the obtained polyisocyanates after de-blocking takes reactions with polyacrylate/polyol while ethyl 2-oxocyclopentanecarboxylate, after being activated by atmospheric oxygen, initiate a free radical polymerization of reactive diluents. Thus, the coating contains very low VOC and the coating layer obtained after curing shows good performances in hardness, solvent-resistance, elasticity, adhesion and elongation properties.

Embodiment

The following embodiments are used to illustrate the invention in more details.

The $1^{st}$ embodiment is a blocked polyisocyanate crosslinking agent obtained from reactions of components comprising
   a). at least one polyisocyanate selected from aliphatic polyisocyanate, cycloaliphatic polyisocyanate and polyisocyanate-functional polymer; and
   b). at least one beta-diketone.

The $2^{nd}$ embodiment is the blocked polyisocyanate crosslinking agent according to the $1^{st}$ embodiment, wherein said polyisocyanate is preferably at least one selected from hexamethylene diisocyanate, hexamethylene diisocyanate trimer, 4,4'-dicyclohexylmethane diisocyanate and polyisocyanate-functional aliphatic acrylic ester.

The $3^{rd}$ embodiment is the blocked polyisocyanate crosslinking agent according to any one of embodiments 1 to 2, wherein said beta-diketone is at least one selected from 1,3-indandione, 1-(2-aminophenyl)decane-1,3-dione, 2'-O-methyllicodione, 2,4,4',6-tetrahydroxydibenzoylmethane, 2,4-dioxopentanedioic acid, Ethyl 2-oxocyclopentanecarboxylate, 2-[(2,6-dioxocyclohexyl)methyl]cyclohexane-1,3-dione, 2-[(4,4-dimethyl-2,6-dioxocyclohexyl)methyl]-5,5-dimethylcyclohexane-1,3-dione, 2-[1-(2,6-dioxocyclohexyl)-3-phenylprop-2-ynyl]cyclohexane-1,3-dione, 2-cyano-3-cyclopropyl-1-(2-mesyl-4-trifluoromethylphenyl)propan-1,3-dione, 3,5-dioxooctanedioic acid, 3,6-dihydroxycyclohexane-1,2,4,5-tetrone, 3-dehydro-scyllo-inosose, 3-fumarylpyruvic acid, 3-hydroxy-2,4-dioxopentyl phosphate, 3-maleylpyruvic acid, 3-undecylcyclohexane-1,2,4,5-tetrone, 4,6-dioxohept-2-enedioic acid, 4,6-dioxoheptanoic acid, 4-(2-aminophenyl)-2,4-dioxobutanoic acid, 4-(3-methyl-5-isoxazolyl)-5-phenylcyclohexane-1,3-dione, 4-[4-(3,5-dioxohexyl)phenylcarbamoyl]butyric acid, 4-fumarylacetoacetic acid, 4-maleylacetoacetic acid, 5,7-icosanedione, 5-(2,2-diferuloylethen-1-yl)thalidomide, 5-(2-furanyl)cyclohexane-1,3-dione, 5-(hydroxymethyl)-3-(1-oxohexadecyl)oxolane-2,4-dione, 5-ethylundecane-2,4-dione, 5-hydroxy-2,4-dioxopentanoic acid, 6,8-icosanedione, 6-Gingerdione, acetylacetone, acetylpyruvic acid, alpha-acetylbutyrolactone, anisindione, berkeleydione, berkeleytrione, bicyclo[2.2.2]octane-2,6-dione, bicyclopyrone, bisdemethoxycurcumin, clethodim, curcumin, cyclohexane-1,3-dione, cyclopentane-1,3-dione, cycloxydim, demethoxycurcumin, dibenzoylmethane, dihydrocurcumin, hentriacontane-14,16-dione, licodione, ninhydrin, nonane-4,6-dione, phenindione, tenuazonic acid, tetrahydrocurcumin and tritriacontane-16,18-dione.

The $4^{th}$ embodiment is the blocked polyisocyanate crosslinking agent according to the $3^{rd}$ embodiment, wherein said beta-diketone is preferably ethyl 2-oxocyclopentanecarboxylate and/or alpha-acetylbutyrolactone.

The $5^{th}$ embodiment is the blocked polyisocyanate crosslinking agent according to any one of embodiments 1 to 4, wherein it further comprises at least one (meth)acrylate having sulfhydryl group and/or amino group and/or hydroxyl group.

The $6^{th}$ embodiment is the blocked polyisocyanate crosslinking agent according to the 5th embodiment, wherein said (meth)acrylate is at least one selected from 2-hydroxyethyl acrylate, 2-hydroxypropyl acrylate, 2-hydroxyethyl methacrylate, 3- and 4-hydroxybutyl acrylate, 3- and 4-hydroxybutyl methacrylate, 6-hydroxyethyl acrylate, 6-hydroxyethyl methacrylate, 3-hydroxy-2-ethylhexyl acrylate, 3-hydroxy-2-ethylhexyl methacrylate, 2-hydroxypropyl methacrylate, 3-(acryloyl)-2-hydroxypropyl methacrylate, pentaerythritol triacrylate, pentaerythritol trimethacrylate, 2-aminoethyl acrylate, 2-aminoethyl methacrylate, 2-(tert-butylamino)ethyl acrylate, 2-(tert-butylamino)ethyl methacrylate, N,N-diethylaminoethyl acrylate, N,N-diethylaminoethyl methacrylate, N,N-dimethylaminoethyl acrylate N,N-dimethylaminoethyl methacrylate, 2,2,6,6-tetramethyl-4-piperidyl acrylate, and 2,2,6,6-tetramethyl-4-piperidyl methacrylate. Mixtures thereof can also be used.

The $7^{th}$ embodiment is the blocked polyisocyanate crosslinking agent according to the 6th embodiment, wherein said (meth)acrylate is preferably at least one selected from 2-(tert-butylamino)ethylmethacrylate, 2-hydroxyethyl methacrylate and 2-hydroxyethyl acrylate.

The $8^{th}$ embodiment is the blocked polyisocyanate crosslinking agent according to any one of embodiments 5 to 7, wherein the molar ratio of said beta-diketone and said (meth)acrylate is from 1:10 to 10:0 and preferably from 1:2 to 2:1.

The $9^{th}$ embodiment is a method of preparing the blocked polyisocyanate crosslinking agent according to any one of embodiments 5 to 8, wherein it comprises steps of:
   i). reactions of polyisocyanate and beta-diketone; and
   ii) reactions of (meth)acrylate and the resultant product obtained from step i).

The 10th embodiment is a coating composition comprising
A). at least one blocked polyisocyanate crosslinking agent according to any one of embodiments 1 to 9; and B). at least one reactive diluent.

The 11th embodiment is a coating composition comprising
A). at least one blocked polyisocyanate crosslinking agent according to any one of embodiments 1 to 9; and C). at least one polyol.

The 12th embodiment is a coating composition comprising
A). at least one blocked polyisocyanate crosslinking agent according to any one of embodiments 1 to 9; B). at least one reactive diluent; and C). at least one polyol.

The 13th embodiment is a coating composition comprising
A). at least one blocked polyisocyanate crosslinking agent according to any one of embodiments 1 to 9; B). at least one reactive diluent; and D). at least one unsaturated polyester.

The 14th embodiment is a coating composition according to the 13th embodiment, wherein it further comprising at least one sagging control agent that has a solid content of no less than 90% by weight based on the total weight of sagging control agent.

EXAMPLE

The present invention will now be described with reference to Examples which are not intended to limit the present invention.

Example 1: Preparation of Blocked Polyisocyanate Crosslinking Agent 330.2 g (0.51 mol) of HDI (Hexamethylene diisocyanate)-trimer (Evonik Desmodur N3000) and 20 mg catalyst sodium methoxylate have been placed in a flask under nitrogen atmosphere. 80 g (0.16 mol)) of Ethyl 2-oxocyclopentanecarboxylate has been added dropwise at room temperature, whereas the reaction temperature increased to 40° C. at the end. External heating to 80° C. and stirring under nitrogen has been followed until NCO content has been at the calculated value. Reaction mixture has been cooled to room temperature, 189.8 g (0.31 mol) of 2-(tert-Butylamino) ethylmethacrylate (Sinopharm) has been added dropwise and temperature kept between 35-45° C. until NCO content has been 0%. 600 g of a slightly yellowish liquid has been obtained which was further diluted in to mixtures of reactive diluters HDDA and TMPTA in different ratios (100:0% to 0:100%). Rest initiator content was below HPLC detection limit<0.01%.

Example 2: Preparation of Blocked Polyisocyanate Crosslinking Agent 66.04 g (0.34 mol) of HDI-trimer (Evonik Desmodur N3000) and 20 mg catalyst sodium methoxylate have been placed in a flask under nitrogen atmosphere. 16 g (0.1 mol) of AcBL has been added dropwise at 40° C. within 30 minutes. External heating to 80° C. and stirring under nitrogen has been followed until NCO content has been at the calculated value. Reaction mixture has been cooled to room temperature, 38 g (0.2 mol) of 2-(tert-Butylamino) ethylmethacrylate (Sinopharm) has been added dropwise and temperature kept between 35-45° C. until NCO content has been 0%. 120 g of a slightly yellowish liquid has been obtained which was further diluted in to mixtures of reactive diluters HDDA and TMPTA in different ratios (100:0% to 0:100%). Rest initiator content was below HPLC detection limit<0.01%.

Example 3: Preparation of Blocked Polyisocyanate Crosslinking Agent 254.3 g (1.3 mol) of HDI-trimer (Evonik Desmodur N3000) and 80 mg catalyst sodium methoxylate have been placed in a flask under nitrogen atmosphere. 64.03 g (0.41 mol) of EOC has been added dropwise at 40° C. within 30 minutes. External heating to 80° C. and stirring under nitrogen has been followed until NCO content has been at the calculated value. Reaction mixture has been cooled to room temperature, 38 g (0.2 mol) of 2-Hydroxyethyl methacrylate (HEMA) has been added dropwise and temperature kept between 35-45° C. until NCO content has been 0%. 260 g of a slightly yellowish liquid has been obtained which was further diluted in to mixtures of reactive diluters HDDA and TMPTA in different ratios (100:0% to 0:100%). Rest initiator content was below HPLC detection limit<0.01%.

Example 4: Preparation of Blocked Polyisocyanate Crosslinking Agent 72.1 g (0.37 mol) of HDI-trimer (Evonik Desmodur N3000) and 20 mg catalyst sodium methoxylate have been placed in a flask under nitrogen atmosphere. 34.9 g (0.22 mol) of AcBL has been added dropwise at 40° C. within 30 minutes. External heating to 80° C. and stirring under nitrogen has been followed until NCO content has been at the calculated value. Reaction mixture has been cooled to room temperature, 13 g (0.11 mol) of 2-Hydroxyethyl acrylate (HEA) has been added dropwise and temperature kept between 35-45° C. until NCO content has been 0%. 120 g of a slightly yellowish liquid has been obtained which was further diluted in to mixtures of reactive diluters HDDA and TMPTA in different ratios (100:0% to 0:100%). Rest initiator content was below HPLC detection limit<0.01%.

Example 5: Preparation of Blocked Polyisocyanate Crosslinking Agent 128.6 g (0.49 mol) of HMDI and 80 mg catalyst sodium methoxylate have been placed in a flask under nitrogen atmosphere. 69.6 g (0.45 mol) of EOC has been added dropwise at 40° C. within 30 minutes. External heating to 80° C. and stirring under nitrogen has been followed until NCO content has been at the calculated value. Reaction mixture has been cooled to room temperature, 51.7 g (0.45 mol) of 2-Hydroxyethyl acrylate (HEA) has been added dropwise and temperature kept between 35-45° C. until NCO content has been 0%. 250 g of a slightly yellowish liquid has been obtained which was further diluted in to mixtures of reactive diluters HDDA and TMPTA in different ratios (100:0% to 0:100%). Rest initiator content was below HPLC detection limit<0.01%.

Example 6: Preparation of Blocked Polyisocyanate Crosslinking Agent 83.8 g (0.29 mol) of Laromer PR 900 and 50 mg catalyst sodium methoxylate have been placed in a flask under nitrogen atmosphere. 16.83 g (0.13 mol) of AcBL has been added dropwise at 40° C. within 30 minutes. External heating to 80° C. and stirring under nitrogen has been followed until NCO content has been at the calculated value. Reaction mixture has been cooled to room temperature, 24.36 g (0.13 mol) of 2-Hydroxyethyl acrylate (HEA) has been added dropwise and temperature kept between 35-45° C. until NCO content has been 0%. 125 g of a slightly yellowish, high viscous liquid has been obtained which was further diluted in to mixtures of reactive diluters HDDA and TMPTA in different ratios (100:0% to 0:100%). Rest initiator content was below HPLC detection limit<0.01%.

Example 7: Preparation of Blocked Polyisocyanate Crosslinking Agent 162.78 g (0.56 mol) of Laromer PR 900 and 10 mg catalyst sodium methoxylate have been placed in a flask under nitrogen atmosphere. 39.9 g (0.26 mol) of EOC has been added dropwise at 40° C. within 30 minutes. External heating to 80° C. and stirring under nitrogen has been followed until NCO content has been at the calculated value. Reaction mixture has been cooled to room temperature, 47.32 g (0.13 mol) of 2-Hydroxyethyl acrylate (HEA) has been added dropwise and temperature kept between 35-45° C. until NCO content has been 0%. 125 g of a slightly yellowish, high viscous liquid has been obtained which was further diluted in to mixtures of reactive diluters HDDA and TMPTA in different ratios (100:0% to 0:100%). Rest initiator content was below HPLC detection limit<0.01%.

Example 8: A Coating Composition and a Coating Layer Obtained after Curing 5.1 g of blocked polyisocyanate crosslinking agent obtained from example 1 has been added to 8.6 g of a OH-functionalized polyacrylic, 300 mg amino catalyst and 300 mg BYK333, and are mixed and stirred until an even mixture was obtained. The mixture was applied by doctor blading or spray applied on tin test panels and was baked at 140° C. for 20 min to get tack free films. After 3 days of post curing single layer tests for performance check are conducted by evaluating the hardness (Koenig's pendulum), crosslinking density (MEK double rub test) as well as bending performance (Conical Bending Test). The tack-free and colorless coating film had a dry thickness of 30-50 μm with K-pendulum values>168 times and MEK double rub values>80 times. Respective coating layer showed no cracking in the conical bending test at all test diameters (diameter from 3.2-38.1 mm).

Example 9: A Coating Composition and a Coating Layer Obtained after Curing 1.0 g of blocked polyisocyanate crosslinking agent obtained from example 1 has been added to 9 g of different mixtures of TMPTA and HDDA (from 10:1 to 1:1 and 1:10), and 200 mg BYK333, and are mixed and stirred until an even mixture was obtained. The mixture was applied by doctor blading or spray applied on tin test panels and was baked at 140° C. for 20 min to get tack free films. After 3 days of post curing single layer tests for performance check are conducted by evaluating the hardness (Koenig's pendulum), crosslinking density (MEK double rub test) as well as bending performance (Conical Bending Test). The tack-free and colorless coating film had a dry thickness of 30-50 μm with K-pendulum values>170 times and MEK double rub values>100 times. Respective coating layer showed no cracking in the conical bending test at all test diameters (diameter from 3.2-38.1 mm).

Example 10: A Coating Composition and a Coating Layer Obtained after Curing 5.1 g of blocked polyisocyanate crosslinking agent obtained from example 1 has been added to 13 g TMPTA, and 8.6 g of a OH-functionalized polyacrylic, 200 mg amino catalyst, 100 mg Mn08 and 300 mg BYK333, and are mixed and stirred until an even mixture was obtained. The mixture was applied by doctor blading or spray applied on tin test panels and was baked at 140° C. for 20 min to get tack free films. After 3 days of post curing single layer tests for performance check are conducted by evaluating the hardness (Koenig's pendulum), crosslinking density (MEK double rub test) as well as bending performance (Conical Bending Test). The tack-free and colorless coating film had a dry thickness of 30-50 μm with K-pendulum values>168 times and MEK double rub values>400 times. Respective coating layer showed no cracking in the conical bending test at all test diameters (diameter from 3.2-38.1 mm).

Example 11: A Coating Composition and a Coating Layer Obtained after Curing 1 g of blocked polyisocyanate crosslinking agent obtained from example 3 has been added to 4.5 g TMPTA, and 4.5 g of a OH-functionalized polyacrylic, and 300 mg BYK333, and are mixed and stirred until an even mixture was obtained. The mixture was applied by doctor blading or spray applied on tin test panels and was baked at 140° C. for 20 min to get tack free films. After 3 days of post curing single layer tests for performance check are conducted by evaluating the hardness (Koenig's pendulum), crosslinking density (MEK double rub test) as well as bending performance (Conical Bending Test). The tack-free and colorless coating film had a dry thickness of 30-50 μm with K-pendulum values>154 times and MEK double rub values>400 times. Respective coating layer showed no cracking in the conical bending test at all test diameters (diameter from 3.2-38.1 mm).

Example 12: A Coating Composition and a Coating Layer Obtained after Curing 1 g of blocked polyisocyanate crosslinking agent obtained from example 6 has been added to 4.5 g TMPTA, and 4.5 g of a OH-functionalized polyacrylic, 200 mg BYK333, and are mixed and stirred until an even mixture was obtained. The mixture was applied by doctor blading or spray applied on tin test panels and was baked at 140° C. for 20 min to get tack free films. After 3 days of post curing single layer tests for performance check are conducted by evaluating the hardness (Koenig's pendulum), crosslinking density (MEK double rub test) as well as bending performance (Conical Bending Test). The tack-free and colorless coating film had a dry thickness of 30-50 μm with K-pendulum values>175 times and MEK double rub values>300 times. Respective coating layer showed no cracking in the conical bending test at all test diameters (diameter from 3.2-38.1 mm).

Example 13: Preparation of Unsaturated Polyester 210 g of trimethylol propane, 503 g itaconic acid, 329 g 1,4-butandiol, 12 g Xylene, 0.5 g MEHQ and 1.5 g BHT have been placed in a reactor, heat up to 100° C. and kept for 60 minutes. The temperature has been increased to 160° C. and kept for another hour before increasing to 230° C. and kept for 2 hours. Xylene has been distilled off during the reaction. Cooling to 80° C. and adding 322 g hexohydrophthalic anhydride, 100 mg BHT and 80 mg MEHQ (hydroquinone monomethyl ether) to the mixture and heating up to 140° C. for several hours. Adding 623 g Cadura E10P, 100 mg BHT and 80 mg MEHQ to the reaction mixture over 1.5 hours, cool down to 40° C. and adding 500 g trimethylolpropane triacrylate and 500 g 1,6-hexandiol diacrylate. The reaction leads to a solvent-free low viscous unsaturated polyester resin (67% in reactive diluents) with acid value of 10-50 mg KOH/g, hydroxy value of 100-300 mg KOH/g and Tg (glass transition temperature) of −55° C.

Example 14: Preparation of Unsaturated Polyester 189 g of trimethylol propane, 535 g hexohydrophthalic anhydride, 296 g 1,4-butandiol and 11 g Xylene have been placed in a reactor, heat up to 100° C. and kept for 60 minutes. The temperature has been increased to 160° C. and kept for another hour before increasing to 230° C. and kept for 2 hours. Xylene has been distilled off during the reaction. Cooling to 80° C. and adding 280 g itaconic acid, 900 mg BHT and 500 mg MEHQ to the mixture and heating up to 140° C. for several hours. Adding 461 g Cadura E10P, 300 mg BHT and 150 mg MEHQ to the reaction mixture over 1.5 hours, cool down to 40° C. and adding 233 g trimethylolpropane triacrylate and 233 g 1,6-hexandiol diacrylate. The reaction lead to a solvent-free low viscous unsaturated polyester resin (80% in reactive diluents) with acid value of 10-50 mg KOH/g, hydroxy value of 100-300 mg KOH/g and Tg of −26° C.

Example 15: A Coating Composition and a Coating Layer Obtained after Curing

For a typical 2K system composition A (160 g Trimethylol propane triacrylate, 100 g 1,6-Hexamethylene diacrylate, 20 g butyl acetate, 150 g of blocked polyisocyanate crosslinking agent obtained from example 1 and 125 g of unsaturated polyester obtained from example 13) has been added to composition B (1.2 g catalyst 9001, 166 mg catalyst Borchers Deca Manganese 8, 1.1 g BYK 378 and 5.5 g BYK 410), and are mixed and stirred until an even mixture was obtained. VOC value of the coating composition has been measured to be 105 g/L. The mixture was spray applied on tin test panels and was baked at 140° C. for 20 min to get tack free films. After 3 days of post curing single layer tests for performance check are conducted by evaluating the hardness (Koenig's pendulum), crosslinking density (MEK double rub test) as well as bending performance (Conical Bending Test). The tack-free and colorless coating film had a dry thickness of 25-60 μm with K-pendulum values>98 times and MEK double rub values>400 times. Respective coating layer showed no cracking in the conical bending test at all test diameters (diameter from 3.2-38.1 mm).

Example 16: A Coating Composition and a Coating Layer Obtained after Curing

For a typical 2K system composition A (160 g Trimethylol propane triacrylate, 100 g 1,6-Hexamethylene diacrylate, 20 g butyl acetate, 150 g of blocked polyisocyanate crosslinking agent obtained from example 1 and 125 g of unsaturated polyester obtained from example 14 has been added to composition B (1.2 g catalyst 9001, 166 mg catalyst Borchers Deca Manganese 8, 1.1 g BYK 378 and 5.5 g BYK 410), and are mixed and stirred until an even mixture was obtained. VOC value of the coating composition has been measured to be 103 g/L. The mixture was spray applied on tin test panels and was baked at 140° C. for 20 min to get tack free films. After 3 days of post curing single layer tests for performance check are conducted by evaluating the hardness (Koenig's pendulum), crosslinking density (MEK double rub test) as well as bending performance (Conical Bending Test). The tack-free and colorless coating film had a dry thickness of 25-60 μm with K-pendulum values>84 times and MEK double rub values>450 times. Respective coating layer showed no cracking in the conical bending test at all test diameters (diameter from 3.2-38.1 mm).

Example 17: Preparation of High Solid Content Sagging Control Agent 782 g (3.5 mol) of 1,6-Hexandiol diacrylate, 261 g (0.9 mol) trimethylolpropane triacrylate have been precharged into the can and start dissolving with 500 rpm. A mixture of 27.4 g (0.3 mol) benzylamine and 67 g butyl acetate have been added, mixing speed increase to 2000 rpm, and further stirred for 2 minutes. 21.2 g (0.13 mol) Hexamethylene diisocyanate in 41 g butyl acetate have been added over 10 minutes, and the stirring continued for another 2 minutes after complete addition. A SCA solution with 4% diurea crystallites in reactive diluents (HDDA:TMPTA=75:25) and 9% butyl acetate has been obtained as white colored, turbid solution with paste-like behavior (total solid content of active diurea crystallites+reactive diluents=91%). The viscosity of the solution was $\eta_1$(shear rate=1000 s$^{-1}$)=64 mPa s and $\eta_2$(shear rate=1 s$^{-1}$)=5118 mPa s, respectively.

Example 18: Preparation of High Solid Content Sagging Control Agent 437 g (1.9 mol) of 1,6-Hexandiol diacrylate has been precharged into the can and start dissolving with 500 rpm. A mixture of 4.1 g (0.05 mol) methoxypropylamine and 25 g butyl acetate have been added, mixing speed increase to 2000 rpm, and further stirred for 2 minutes. 9 g Desmodur N3300 in 25 g butyl acetate have been added over 10 minutes, and the stirring continued for another 2 minutes after complete addition. A SCA solution with 2.5% diurea crystallite in reactive diluent (HDDA) and 10% butyl acetate has been obtained as transparent solution with paste-like behavior (total solid content of active diurea crystallites+reactive diluents=90%). The viscosity of the solution was $\eta_1$(shear rate=1000 s$^{-1}$)=32 mPa s and $\eta_2$(shear rate=1 s$^{-1}$)=1828 mPa s, respectively.

Example 19: Preparation of High Solid Content Sagging Control Agent 437 g (1.5 mol) of trimethylolpropane triacrylate has been precharged into the can and start dissolving with 500 rpm. A mixture of 4.1 g (0.05 mol) methoxypropylamine and 25 g butyl acetate have been added, mixing speed increase to 2000 rpm, and further stirred for 2 minutes. 9 g Desmodur N3300 in 25 g butyl acetate have been added over 10 minutes, and the stirring continued for another 2 minutes after complete addition. A SCA solution with 2.6% diurea crystallite in reactive diluent (TMPTA) and 10% butyl acetate has been obtained as transparent solution with paste-like behavior (total solid content of active diurea crystallites+reactive diluents=90%). The viscosity of the solution was η₁(shear rate=1000 s⁻¹)=80 mPa s and η₂(shear rate=1 s⁻¹)=4473 mPa s, respectively.

Example 20: Preparation of High Solid Content Sagging Control Agent 437 g (1.9 mol) of 1,6 Hexanediol diacrylate has been precharged into the can and start dissolving with 500 rpm. A mixture of 9.5 g (0.1 mol) methoxypropylamine and 28 g butyl acetate have been added, mixing speed increase to 2000 rpm, and further stirred for 2 minutes. 8.8 g (0.05 mol) Hexamethylene diisocyanate in 17 g butyl acetate have been added over 10 minutes, and the stirring continued for another 2 minutes after complete addition. A SCA solution with 3.7% diurea crystallite in reactive diluent (HDDA) and 9% butyl acetate has been obtained as white colored, turbid solution with paste-like behavior (total solid content of active diurea crystallites+reactive diluents=91%). The viscosity of the solution was $\eta_1$(shear rate=1000 s⁻¹)=22 mPa s and $\eta_2$(shear rate=1 s⁻¹)=3266 mPa s, respectively.

Example 21: A Coating Composition and a Coating Layer Obtained after Curing

For a typical 2K system composition A (6 g Trimethylol propane triacrylate, 15 g of blocked polyisocyanate crosslinking agent obtained from example 1, 2 g butyl acetate, 20 g of sagging control agent obtained from example 17 and 12 g of unsaturated polyester obtained from example 14) has been added to composition B (0.1 g catalyst 9001, 17 mg catalyst Borchers Deca Manganese 8, 0.1 g BYK 378), and are mixed and stirred until an even mixture was obtained. The coating composition showed thixotropic behavior with a ratio of low- to high-shear viscosity of $\eta_2$(shear rate=1 s⁻¹)/$\eta_1$(shear rate=1000 s⁻¹)>6. VOC value of the coating composition has been measured to be 160 g/L. The mixture was spray applied on tin test panels and was baked at 140° C. for 20 min to get tack free films. After 3 days of post curing single layer tests for performance check are conducted by evaluating the hardness (Koenig's pendulum), crosslinking density (MEK double rub test) as well as bending performance (Conical Bending Test). The tack-free and colorless coating film had a dry thickness of 25-60 μm with K-pendulum values>56 times and MEK double rub values>120 times. Respective coating layer showed no cracking in the conical bending test at all test diameters (diameter from 3.2-38.1 mm).

Example 22: A Coating Composition and a Coating Layer Obtained after Curing

For a typical 2K system composition A (6 g 1,6-hexanediol diacrylate, 15 g of blocked polyisocyanate crosslinking agent, 2 g butyl acetate, 20 g of sagging control agent obtained from example 19 and 12 g of unsaturated polyester obtained from example 14) has been added to composition B (0.1 g catalyst 9001, 17 mg catalyst Borchers Deca Manganese 8, 0.1 g BYK 378), and are mixed and stirred until an even mixture was obtained. The coating composition showed thixotropic behavior with a ratio of low- to high-shear viscosity of $\eta_2$(shear rate=1 s⁻¹)/$\eta_1$(shear rate=1000 s⁻¹)>6. VOC value of the coating composition has been measured to be 103 g/L. The mixture was spray applied on tin test panels and was baked at 140° C. for 20 min to get tack free films. After 3 days of post curing single layer tests for performance check are conducted by evaluating the hardness (Koenig's pendulum), crosslinking density (MEK double rub test) as well as bending performance (Conical Bending Test). The tack-free and colorless coating film had a dry thickness of 25-60 μm with K-pendulum values>84 times and MEK double rub values>400 times. Respective coating layer showed no cracking in the conical bending test at all test diameters (diameter from 3.2-38.1 mm).

Example 23: A Coating Composition and a Coating Layer Obtained after Curing

For a typical 2K system composition A (6 g trimethylol triacrylate, 15 g of blocked polyisocyanate crosslinking agent obtained from example 1, 2 g butyl acetate, 20 g of sagging control agent obtained from example 20 and 12 g of unsaturated polyester obtained from example 14) has been added to composition B (0.1 g catalyst 9001, 17 mg catalyst Borchers Deca Manganese 8, 0.1 g BYK 378), and are mixed and stirred until an even mixture was obtained. The coating composition showed thixotropic behavior with a ratio of low- to high-shear viscosity of $\eta_2$(shear rate=1 s⁻¹)/$\eta_1$(shear rate=1000 s⁻¹)>6. VOC value of the coating composition has been measured to be 132 g/L. The mixture was spray applied on tin test panels and was baked at 140° C. for 20 min to get tack free films. After 3 days of post curing single layer tests for performance check are conducted by evaluating the hardness (Koenig's pendulum), crosslinking density (MEK double rub test) as well as bending performance (Conical Bending Test). The tack-free and colorless coating film had a dry thickness of 25-60 μm with K-pendulum values>84 times and MEK double rub values>400 times. Respective coating layer showed no cracking in the conical bending test at all test diameters (diameter from 3.2-38.1 mm).

Example 24: A Coating Composition and a Coating Layer Obtained after Curing

For a typical 2K system composition A (6 g trimethylol triacrylate, 15 g of blocked polyisocyanate crosslinking agent obtained from example 1, 2 g butyl acetate, 20 g of sagging control agent obtained from example 17 and 12 g of saturated polyester obtained from example 14) has been added to composition B (0.1 g catalyst 9001, 17 mg catalyst Borchers Deca Manganese 8, 0.1 g BYK 378), and are mixed and stirred until an even mixture was obtained. The coating composition showed thixotropic behavior with a ratio of low- to high-shear viscosity of $\eta_2$(shear rate=1 s⁻¹)/$\eta_1$(shear rate=1000 s⁻¹)>6. VOC value of the coating composition has been measured to be 132 g/L. The mixture was spray applied on tin test panels and was baked at 140° C. for 20 min to get tack free films. After 3 days of post curing single layer tests for performance check are conducted by evaluating the hardness (Koenig's pendulum), crosslinking density (MEK double rub test) as well as bending performance (Conical Bending Test). The tack-free and colorless coating film had a dry thickness of 25-60 μm with K-pendulum values>42 times and MEK double rub values>380 times. Respective coating layer showed no cracking in the conical bending test at all test diameters (diameter from 3.2-38.1 mm).

Example 25: A Coating Composition and a Coating Layer Obtained after Curing

For a typical 2K system composition A (57.8 g trimethylol triacrylate, 36.1 g 1,6-hexanediol diacrylate, 53.7 g of blocked polyisocyanate crosslinking agent obtained from example 1, 7.2 g butyl acetate, and 45.2 g of saturated polyester obtained from example 14 has been added to composition B (0.4 g catalyst 9001, 60 mg catalyst Borchers Deca Manganese 8, 0.4 g BYK 378), and are mixed and stirred until an even mixture was obtained. VOC value of the coating composition has been measured to be 89 g/L. The mixture was spray applied on tin test panels and was baked at 140° C. for 20 min to get tack free films. After 3 days of post curing single layer tests for performance check are conducted by evaluating the hardness (Koenig's pendulum), crosslinking density (MEK double rub test) as well as bending performance (Conical Bending Test). The tack-free and colorless coating film had a dry thickness of 25-60 μm with K-pendulum values>84 times and MEK double rub values>500 times. Respective coating layer showed no cracking in the conical bending test at all test diameters (diameter from 3.2-38.1 mm).

<Performance Test Standards>

(1) Hardness

The pendulum damping test after Koenig or Persoz is used to mechanically measure the surface hardness of a coating. The hardness of the coating is determined by the number of oscillations made by the pendulum between two defined angles (6 to 3 degrees for Koenig pendulum or 12 to 4 degrees for Persoz pendulum). With increasing hardness of the coating surface, the number of oscillations is increasing. The methods are standardized in the specification ISO 1522.

(2) Solvent Rub Test

To assess the crosslinking and to ensure the coating system has been cured, a solvent rub test is performed using methylethylketone (MEK) as the solvent. The test is used widely in the paint industry because it provides a quick relative estimation of degree of cure without having to wait for long-term exposure results. The rubs are counted as a double rub (one rub forward and one rub backward constitutes a double rub) which gives a measurable value for the MEK resistance and degree of cure. The MEK double rub values of conventional 2K polyurethane or acid/epoxy clearcoat is about 200 times.

(3) Bending Test

Bending test is used to determine the effects of bending on the elasticity, adhesion and elongation properties of cured coatings on metal panels. The conical bending tester is composed of a frame that has a bending lever with a roller which pivots on a steel conical mandrel with a diameter from 3.2-38.1 mm. The specimen can be bent on part of, or along, the entire length of the mandrel, and the results (cracks) corresponding to different test diameters can be observed in a single operation.

(4) VOC Test

To determine the volatile organic compounds (VOCs) emission of the coating compositions a gravimetric method was applied. The VOC content was measured on the basis of the weight loss of the composition when heated to 130° C. for 60 min.

(5) Rheology Test

The thixotropic effect of the sagging control agents as well as the coating compositions was characterized by using an Anton Paar rheometer. The 2D rheology profile was measured by fast shear rate changes. The test consists of two intervals with two different shear rates (shear rate$_1$=1 s-1, shear rate$_2$=1000 s-1). The thixotropic index is defined as the ratio between the viscosity of a sample at a high ($\eta_2$) and at a low ($\eta_1$) shear.

The invention claimed is:

1. A blocked polyisocyanate crosslinking agent obtained from reactions of components comprising
   a). at least one polyisocyanate selected from the group consisting of aliphatic polyisocyanate, cycloaliphatic polyisocyanate and polyisocyanate-functional polymer;
   b). at least one (meth)acrylate having a sulfhydryl group and/or an amino group and/or a hydroxyl group; and
   c). at least one beta-diketone selected from the group consisting of 1,3-indandione, 1-(2-aminophenyl)decane-1,3-dione, 2'-O-methyllicodione, 2,4,4',6-tetrahydroxydibenzoylmethane, 2,4-dioxopentanedioic acid, ethyl 2-oxocyclopentanecarboxylate, 2-[(2,6-dioxocyclohexyl)methyl]cyclohexane-1,3-dione, 2-[(4,4-dimethyl-2,6-dioxocyclohexyl)methyl]-5,5-dimethylcyclohexane-1,3-dione, 2-[1-(2,6-dioxocyclohexyl)-3-phenylprop-2-ynyl]cyclohexane-1,3-dione, 2-cyano-3-cyclopropyl-1-(2-mesyl-4-trifluoromethylphenyl) propan-1,3-dione, 3,5-dioxooctanedioic acid, 3,6-dihydroxycyclohexane-1,2,4,5-tetrone, 3-dehydroscyllo-inosose, 3-fumarylpyruvic acid, 3-hydroxy-2,4-dioxopentyl phosphate, 3-maleylpyruvic acid, 3-undecylcyclohexane-1,2,4,5-tetrone, 4,6-dioxohept-2-enedioic acid, 4,6-dioxoheptanoic acid, 4-(2-aminophenyl)-2,4-dioxobutanoic acid, 4-(3-methyl-5-isoxazolyl)-5-phenylcyclohexane-1,3-dione, 4-[4-(3,5-dioxohexyl)phenylcarbamoyl]butyric acid, 4-fumarylacetoacetic acid, 4-maleylacetoacetic acid, 5,7-icosanedione, 5-(2,2-diferuloylethen-1-yl)thalidomide, 5-(2-furanyl)cyclohexane-1,3-dione, 5-(hydroxymethyl)-3-(1-oxohexadecyl)oxolane-2,4-dione, 5-ethylundecane-2,4-dione, 5-hydroxy-2,4-dioxopentanoic acid, 6,8-icosanedione, 6-Gingerdione, acetylpyruvic acid, alpha-acetylbutyrolactone, anisindione, berkeleydione, berkeleytrione, bicyclo[2.2.2]octane-2,6-dione, bicyclopyrone, bisdemethoxycurcumin, clethodim, curcumin, cyclohexane-1,3-dione, cyclopentane-1,3-dione, cycloxydim, demethoxycurcumin, dihydrocurcumin, hentriacontane-14,16-dione, licodione, ninhydrin, nonane-4,6-dione, phenindione, tenuazonic acid, tetrahydrocurcumin and tritriacontane-16,18-dione.

2. The blocked polyisocyanate crosslinking agent according to claim 1, wherein said polyisocyanate is at least one selected from the group consisting of hexamethylene diisocyanate, hexamethylene diisocyanate trimer, 4,4'-dicyclohexylmethane diisocyanate and polyisocyanate-functional aliphatic acrylic ester.

3. The blocked polyisocyanate crosslinking agent according to claim 1, wherein said beta-diketone is ethyl 2-oxocyclopentanecarboxylate and/or alpha-acetylbutyrolactone.

4. The blocked polyisocyanate crosslinking agent according to claim 1, wherein said (meth)acrylate is at least one selected from the group consisting of 2-hydroxyethyl acrylate, 2-hydroxypropyl acrylate, 2-hydroxyethyl methacrylate, 3- and 4-hydroxybutyl acrylate, 3- and 4-hydroxybutyl methacrylate, 6-hydroxyethyl acrylate, 6-hydroxyethyl methacrylate, 3-hydroxy-2-ethylhexyl acrylate, 3-hydroxy-2-ethylhexyl methacrylate, 2-hydroxypropyl methacrylate, 3-(acryloyl)-2-hydroxypropyl methacrylate, pentaerythritol triacrylate, pentaerythritol trimethacrylate, 2-aminoethyl acrylate, 2-aminoethyl methacrylate, 2-(tert-butylamino) ethyl acrylate, 2-(tert-butylamino)ethyl methacrylate, N,N- diethylaminoethyl acrylate, N,N-diethylaminoethyl methacrylate, N,N-dimethylaminoethyl acrylate N,N-dimethylaminoethyl methacrylate, 2,2,6,6-tetramethyl-4-piperidyl acrylate, and 2,2,6,6-tetramethyl-4-piperidyl methacrylate.

5. The blocked polyisocyanate crosslinking agent according to claim 1, wherein said (meth)acrylate is at least one selected from the group consisting of 2-(tert-butylamino) ethyl methacrylate, 2-hydroxyethyl methacrylate and 2-hydroxyethyl acrylate.

6. The blocked polyisocyanate crosslinking agent according to claim 1, wherein a molar ratio of said beta-diketone and said (meth)acrylate is from 1:10 to 10:1.

7. A method of preparing the blocked polyisocyanate crosslinking agent according to claim 1, wherein the method comprises steps of:
  i). reacting polyisocyanate and beta-diketone; and
  ii) reacting (meth)acrylate and the resultant product obtained from step i).

8. A coating composition comprising
  A). at least one blocked polyisocyanate crosslinking agent according to claim 1; and
  B). at least one reactive diluent.

9. A coating composition comprising
  A). at least one blocked polyisocyanate crosslinking agent according to claim 1; and
  C). at least one polyol.

10. A coating composition comprising
  A). at least one blocked polyisocyanate crosslinking agent according to claim 1;
  B). at least one reactive diluent; and
  C). at least one polyol.

11. A coating composition comprising
  A). at least one blocked polyisocyanate crosslinking agent according to claim 1;
  B). at least one reactive diluent; and
  D). at least one unsaturated polyester.

12. The coating composition according to claim 11, wherein the coating composition further comprises at least one sagging control agent that has a solid content of no less than 90% by weight based on a total weight of the at least one sagging control agent.

13. The blocked polyisocyanate crosslinking agent according to claim 1, wherein a molar ratio of said beta-diketone and said (meth)acrylate is from 1:2 to 2:1.

* * * * *